United States Patent

Mylander

[11] 4,313,459
[45] Feb. 2, 1982

[54] AUTOMATIC FILL-STOP VALVE

[76] Inventor: Gerald D. Mylander, 1232 W. Collins, Orange, Calif. 92667

[21] Appl. No.: 2,954

[22] Filed: Jan. 12, 1979

[51] Int. Cl.³ .................. F16K 21/18; F16K 33/00
[52] U.S. Cl. ............................ 137/416; 137/425; 137/433; 141/198; 251/75
[58] Field of Search ............... 137/393, 416, 425, 430, 137/433, 434, 424, 432; 73/305, 306; 141/192, 198, 199, 204; 251/320, 74, 75

[56] References Cited

U.S. PATENT DOCUMENTS

| | | | |
|---|---|---|---|
| 756,397 | 4/1904 | McNamara | 251/74 |
| 1,182,524 | 5/1916 | Berg et al. | 137/433 |
| 1,187,773 | 6/1916 | Oldham | 137/416 |
| 1,204,653 | 11/1916 | Alexander | 137/433 |
| 1,470,213 | 10/1923 | Black | 137/433 |
| 1,484,798 | 2/1924 | Smith | 137/434 |
| 1,591,799 | 7/1926 | Tinapp | 137/433 |
| 2,087,913 | 7/1937 | Kenney et al. | 137/430 |
| 2,122,866 | 7/1938 | Lippold | 137/433 |
| 2,376,628 | 5/1945 | Shanley | 141/198 |
| 2,767,551 | 10/1956 | Clute | 137/433 |
| 2,767,552 | 10/1956 | Clute | 137/433 |
| 2,834,370 | 5/1958 | Nelson | 137/433 |
| 2,886,056 | 5/1959 | Ratliff | 137/430 |
| 2,965,127 | 12/1960 | Kirschner et al. | 137/433 |
| 3,233,625 | 2/1966 | Pase | 137/416 |
| 3,351,083 | 11/1967 | Sait | 137/433 |
| 3,467,135 | 9/1969 | Muskulla | 137/416 |
| 3,929,155 | 12/1975 | Garretson | 141/198 |

Primary Examiner—Martin P. Schwadron
Assistant Examiner—G. L. Walton
Attorney, Agent, or Firm—Allen A. Dicke, Jr.

[57] ABSTRACT

Inlet into propane cylinder is covered by sliding sleeve which is raised by a float when the tank level reaches desired level. Float is partly counterbalanced by lift spring and is driven into closed position by hydraulic force when motion is initiated by the float.

11 Claims, 3 Drawing Figures

U.S. Patent
Feb. 2, 1982
4,313,459
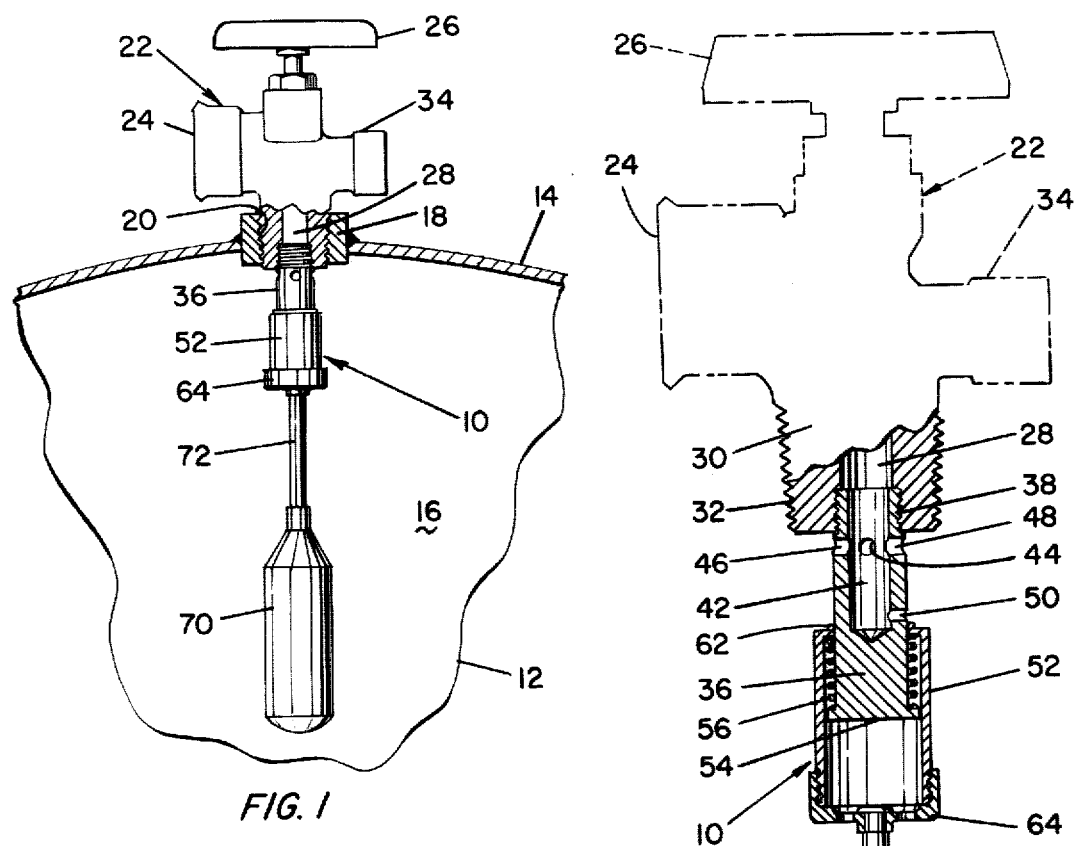
FIG. 1
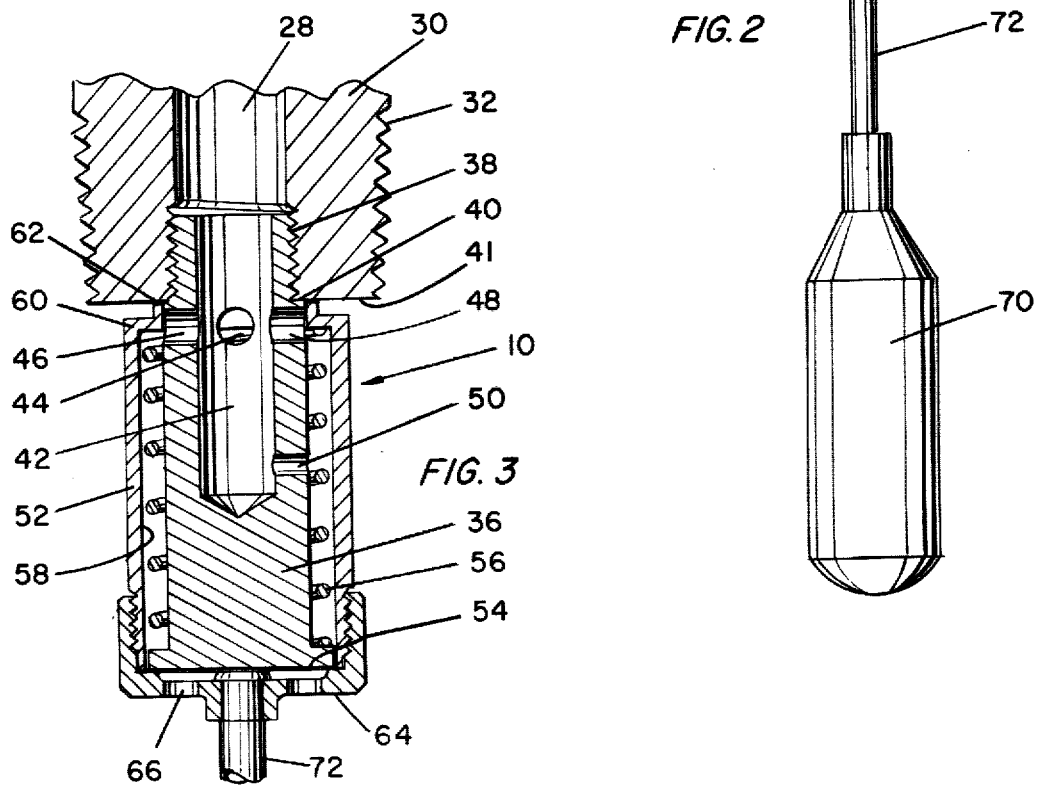
FIG. 2
FIG. 3

AUTOMATIC FILL-STOP VALVE

BACKGROUND

This invention is directed to an automatic fill-stop valve for automatically stopping the filling of a propane cylinder when it reaches the desired maximum level. The valve is particularly useful for the portable tanks used in recreational vehicles and other small installations which are called cylinders. These cylinders and fittings are controlled by the regulations of the Department of Transportation, and are often known as DOT cylinders.

Liquefied petroleum gas, including propane and butane, is extensively used for household cooking and heating where natural gas or manufactured gas is unavailable. Furthermore, liquefied petroleum gas is used for these purposes. Liquefied petroleum gas is extremely volatile and burns readily. In the liquefied state, the vapor pressure of propane and butane is such that the liquid can be stored in tanks of only moderate strength in outdoor locations at the ambient temperatures encountered. These characteristics make liquefied petroleum gas extremely desirable for use as fuels. In addition to cooking and space heating, the gases are employed as internal combustion engine fuel and as process gas.

Liquefied petroleum gas must be handled very cautiously due to its characteristics. For example, liquefied propane and butane have boiling points lower than the normal atmospheric temperatures. Thus, they vaporize readily under normal ambient temperature conditions. The vapor pressure is sufficiently high that they are volatile at ordinary outdoor ambient temperatures, at atmospheric pressure. However, the pressure can be contained in the tank in reasonable thickness so that the volatility provides the tank pressurization which supplies the gas to its point of use.

In addition to the foregoing characteristics, these liquefied petroleum gases have extremely high thermal coefficients of expansion such that even moderate changes in temperature thereof cause the liquid to expand or contract appreciably. For this reason, it is necessary to maintain a void or head space in a tank where the liquefied petroleum gas is stored. A portion of the volume of any such tank must be left unoccupied with the liquid to allow for expansion upon increase in temperature. In fact, most states now prohibit the filling of any such tank with liquefied gas beyond a certain percentage of the volume of the tank.

The most common present device for determining maximum tank fill comprises a level-sensing dip tube which extends down into the tank to the point of highest proper liquid level in the tank. The dip tube vents outside the tank and has a manual valve thereon. The manual valve is opened, and filling is commenced. Vapor from the tank head space is discharged out of the open manual valve and, when the tank is filled with liquid to the bottom of the dip tube, the liquid level is sensed thereat by the liquid discharging from the manual valve. The liquid expands and vaporizes as it reaches the atmosphere, thus creating a telltale white cloud. When seeing such a cloud, the operator shuts off the fill valve and terminates the filling operation. Another common fill-limit detection means is weighing.

Of course, such a system requires that the filling operator remain alert, because he must turn off the fill valve at the proper time. If the operator fails to respond at the right time, the tank can be filled considerably above the safe limit. Thereafter, in the event of even a moderate increase in temperature of the liquid, the liquid can expand to fill the entire tank. Further expansion would cause a rapid increase in pressure and could rupture the tank. With tank rupture, an extremely hazardous condition occurs when the volatile liquid and vapor is spilled. A spark can produce a destroying fire.

To prevent the occurrence of such hazardous conditions, it is apparent that an automatic fill-stop valve is required. G. D. Mylander U.S. Pat. No. 3,363,641 illustrates an automatic flow control valve which is responsive to the liquid level so that filling is stopped. This prior automatic flow control valve is arranged for ASME tanks with separate filling and withdrawal ports. That filling-stop valve is not adaptable to cylinders.

SUMMARY

In order to aid in the understanding of this invention, it can be stated in essentially summary form that it is directed to an automatic fill-stop valve for propane cylinder where a propane inlet into the cylinder is closed by a sleeve which is moved to inlet-closing position when a float connected to the sleeve signals desired maximum cylinder-filling level.

It is thus an object of this invention to provide an automatic fill-stop valve which is suitable for limiting the filling level of DOT standard propane cylinders. It is a further object to provide an automatic fill-stop valve which can be installed through the main cylinder fitting, which is often the only fitting on DOT standard propane cylinders. It is a further object to provide an automatic fill-stop valve which, with reasonable reliability, stops the filling when the desired maximum filling height is achieved so that the operator can close the filling valve and disconnect the filling nozzle. It is a further object to provide an automatic fill-stop valve which has a float thereon positioned to shut off the inlet when the desired liquid propane level is reached in the tank so that the filling flow is shut off. It is a further object to provide an automatic fill-stop valve which can be installed in standard cylinders and on standard service valves so that retrofitting is possible.

Other objects and advantages of this invention will become apparent from a study of the following portion of the specification, the claims, and the attached drawings.

BRIEF DESCRIPTION OF THE DRAWINGS

FIG. 1 is a section through a portion of a propane cylinder at the fitting thereof showing the automatic fill-stop valve of this invention in side elevation and positioned therein.

FIG. 2 is an enlarged view of a portion of the structure shown in FIG. 1, with parts taken in section and parts broken away, showing the valve in the open position.

FIG. 3 is a further enlarged section through the valve of this invention, with parts taken in section and parts broken away, showing the valve in the closed position.

DESCRIPTION OF THE PREFERRED EMBODIMENT

The automatic fill-stop valve of this invention is generally indicated at 10 in FIGS. 1, 2 and 3. In FIG. 1, cylinder 12 has wall 14 which encloses the interior cylinder volume 16. Cylinder fitting 18 is the only opening in the cylinder, and in the cylinders under consideration, fitting 18 is located at the top of the cylinder. Fitting 18 is welded into wall 14 and carries an interior threaded opening 20.

Valve 22 is a standard service valve which is commercially available. It has an opening 24 which is conventionally threaded to receive either a filling nozzle or utilization tubing. Valve handle 26 controls an internal valve structure which controls continuity from opening 24 to passage 28. Passage 28 is in boss 30 of valve 22, which has external threads 32 which engage in threaded opening 20. In this way, control of flow into and out of tank 12 is achieved. Valve 22 is also equipped with a relief valve built therein in boss 34. This much of the cylinder 12 and service valve 22 is conventional.

Automatic fill-stop valve 10 has body 36 which serves as the main fixed structural part of the valve. It is stem-shaped and, at its upper part, carries external screwthreads 38 which engage in corresponding screwthreads on the bottom end of passage 28. Shoulder 40 engages on the flat end surface 41 of boss 30. Bore 42 extends down through the top of body 36 and is closed at the bottom. Channels 44, 46 and 48 are drilled crosswise through body 36 below shoulder 40. Another, fourth channel may also be drilled.

One of the critical parts of this invention is the fact that the channels are not symmetrical about any plane lying through the axis of body 36, the axis being upright along the length of body 36 and lying in the plane of the paper in FIG. 3. If three channels are employed, such as are illustrated in FIGS. 2 and 3, then they may be at any angular relationship except 120 degrees from each other. The 90 degrees-apart illustrated in FIG. 3 is a satisfactory relationship. If four are employed, the fourth one is not at 90 degrees, but for example, at 60 degrees. The reason for this is that, when cylinder 12 is fairly empty and filling is started, the liquid propane gushes in streams out of the channels, follows the curve of the cylinder, and when there is not much liquid in the bottom, these streams join together and fountain upward. If the channels are symmetrical, then the fountain is at the center. The fountain can impinge upon the float of valve 10 to give a signal that the cylinder is at its desired maximum fill level, when it is not. By placing the channels in a non-symmetrical relationship, then the fountain is not at the center of the cylinder and does not cause this false signal. In addition to the channels 44, 46 and 48, power channel 50 is formed to extend out of bore 42, but below the discharge channels. Spring flange 54 is formed on the lower part of body 36, and compression spring 56 rests on spring flange 54.

Sleeve 52 has an interior bore 58 which fairly closely fits around spring flange 54. The top of sleeve 52 has collar 60 which fits around the main part of body 36. Neck 62 on collar 60 engages against the bottom surface 41 of boss 30 when the valve is closed, as seen in FIG. 3. Cap 64 is threadedly engaged on the bottom of sleeve 52 and engages against the bottom surface of spring flange 54 at the same time, in the closed position. Vent holes 66 in the cap vent out the volume below spring flange 54 and above cap 64. Spring 56 is a compression spring engaged between spring collar 54 and collar 60.

It is critical to the design that the length from shoulder 40 to the bottom surface of flange 54 on body 36 be exactly the same length as the distance from the top surface of neck 62 to the lower end of sleeve 52. With these dimensions, when shoulder 40 is screwed against surface 41 and cap 64 is screwed against the lower end of sleeve 52, then with the sleeve in its raised position, neck 62 seals against surface 41 at the same time cap 64 seals against flange 54.

Float 70 is a closed, hollow float structure which has positive buoyancy in liquid propane. Float 70 has float stem 72 secured to the top thereof, with the float stem secured into cap 64, as by riveting, as shown in FIG. 3. The length of float stem 72 is such that, when valve 10 is screwed into a control valve 22 which is screwed into cylinder 12, then the float is positioned so that it is engaged in liquid propane when the liquid propane rises to the desired shutoff level in the cylinder. This level is often an 80 percent quantity of liquid volume so that 20 percent vapor volume remains for liquid expansion. In tanks of different size and shape, the length of stem 72 will be selected to provide the shutoff at the proper point in that particular cylinder.

In operation, the filling nozzle is connected to opening 24; control valve 22 is opened; and pressurized propane is delivered. If tank 12 is filled with liquid propane to the desired level, the float 70 will raise sleeve 52 to enclose drive channel 50. Pressure is thereby introduced into the spring cavity, assisting the spring and float in lifting sleeve 52 to shut off, as shown in FIG. 3. At the instant that the spring cavity is pressurized, the sleeve 52 is thrust upward, pulling the float. The float position in the liquid, at the end of upward travel, is about ½ inch above its resting place in the liquid. Therefore, the float will fall ½ inch when filling pressure is removed. In this position, spring 56 is solid to limit the downward position, and collar 62 is just below the lower edge of power channel 50. Under these circumstances, when liquid propane is supplied for filling, the liquid propane rushes out of channels 44, 46 and 48 and out of power channel 50. In view of the lack of symmetry of the discharge channels, any fountaining in the cylinder is away from float 70 so that no false liquid-presence signals are supplied to float 70. Instead, filling continues until the liquid level reaches float 70. With buoyancy supplied to float 70, spring 56 raises sleeve 52. As soon as collar 60 rises above drive channel 50, when the inflowing liquid pressurizes the spring chamber. With the spring chamber pressurized, upward force is applied to sleeve 52 and the float carried thereon so that the sleeve rapidly moves upward to close off discharge channels, 44, 46 and 48.

In use, a utilization pipe is connected to opening 24 of service valve 22, the valve is opened, and vapor is discharged from the tank. When valve 10 is in the closed position, with the sleeve 52 raised with its neck 62 against bottom surface 41, then the discharge of vapor from passage 28 communicates through the channels 44, 46, 48 and 50 to the pocket in which spring 56 is located. This reduction in pressure with respect to the pressure in the interior of cylinder 12 causes a downward force on sleeve 52. The downward force drives the sleeve down to uncover the channels so that outflow of propane vapor is possible. Thus, the valve 10 does not impede outflow from the tank. As long as outflow continues, the reduced pressure is communicated through power channel 50 to hold the sleeve toward the downward position, even though float 70 is in liquid propane. In this way, withdrawal of propane vapor is achieved.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A float valve for controlling liquid inflow into a tank which also has a manual service valve to stop inflow when the liquid level in the tank reaches a desired level, said float valve comprising:
   a body arranged to be oriented and secured in the tank and in an upright position in the tank, a bore in said body, said bore being for connection in series with the service valve to receive all liquid inflow into the tank, a channel laterally extending out of said body from said bore so that liquid flowing into the tank flows out of said channel;
   a tubular sleeve around said body, said sleeve having a collar therein embracing said body, said collar having an area, said sleeve being slidably mounted for movement along said body from a lowered position where said channel is uncovered, at which position said sleeve is far enough away from said channel so that the sleeve is substantially unaffected by hydrodynamic forces of liquid discharge by said channel, said sleeve having an area substantially equal to said area on said collar, said area on said sleeve being subjected to tank pressure, said sleeve being movable to a raised position where said channel is covered by said sleeve and wherein higher than tank fluid pressure from said channel during filling acts against said area on said collar and tank pressure acts on said area on said sleeve to cause a raising force to urge said sleeve upwardly, said sleeve having seal means thereon for sealing against seal means secured to the tank when said sleeve is in the raised position; and
   a float mounted on said sleeve, said float being positioned to raise said sleeve to cover said channel when the desired liquid level is reached in said tank.

2. The valve of claim 1 wherein said channel is a discharge channel and there is also a power channel extending from said bore to the exterior of said body, said power channel being positioned so that liquid flow out of said power channel exerts negligible hydrodynamic force on said sleeve when said sleeve is in its lowered, channel uncovered position.

3. A float valve for controlling liquid inflow into a tank to stop inflow when the liquid level in the tank reaches a desired level, the tank also has a manual valve in series with the float valve for manual control of the inflow, said float valve comprising:
   a body arranged to be secured to attachment means in the tank so that the body is oriented in an upright position in the tank, a bore in said body, said bore being for connection to receive all liquid inflow into the tank, a channel laterally extending out of said body from said bore so that liquid flowing into the tank flows out of said channel;
   a tubular sleeve positioned around said body and slidably mounted for movement along said body from a lowered position where said channel is uncovered to a raised position where said channel is covered by said sleeve and where the sleeve is in sealing relationship to the float valve body attachment means, said sleeve having an upwardly facing area subject to tank pressure and an equal downwardly facing area subject to channel pressure when said sleeve is in the raised position where channel is covered by said sleeve so that during filling when channel pressure is higher than tank pressure, a net force is applied by the pressures to the sleeve to urge said sleeve upwardly, and upon outflow of fluid from said bore lower than tank pressure in said channel is applied to the downwardly facing area to thrust said sleeve down to open said channel to permit fluid outflow from the tank; and
   a spring positioned between said sleeve and said body to partially support said sleeve and a float mounted on said sleeve, said spring being positioned to urge said sleeve from the channel uncovered position to the channel covered position, said float being positioned to raise said sleeve to cover said channel when the desired liquid level is reached in said tank so that said valve is float-triggered and pressure-operated and said spring partially counterbalances the weight of said float.

4. The valve of claim 3 wherein said channel is a discharge channel, and there is also a power channel extending from said bore to the exterior of said body, said power channel being positioned so that liquid flow out of said power channel exerts negligible hydrodynamic force on said sleeve when said sleeve is in its lowered, channel uncovered position.

5. A float valve for controlling liquid inflow to a tank to signal when liquid level in the tank has reached a predetermined level, said float valve comprising:
   a body for mounting on means in the tank, a passage in said body, said body being for fixing with respect to a tank so that all liquid inflow into the tank passes through said passage in said body, a channel from said passage through said body to discharge liquid from said passage into the tank;
   a sleeve slidably mounted on said body, said sleeve having a lower first position where said sleeve is away from said channel, and a raised second position where said sleeve covers said channel, said sleeve having a collar therein embracing said body, said collar being in sealing relationship with the body mounting means when the sleeve is in its raised second position, said sleeve having an upwardly facing area exposed to tank pressure and an equal downwardly facing area subjected to pressure within said sleeve so that when said sleeve rises away from said first position and covers said channel, said downwardly facing area is subjected to pressure from said channel which is higher than tank pressure during filling so that a net upward force is applied to said sleeve by said pressures to urge said sleeve upward towards said raised second position, and said downwardly facing area is subject to lower than tank pressure upon withdrawal of fluid from the tank out of said passage so that said sleeve is forced down to uncover said channel; and
   a float attached to move said sleeve with respect to said body when said float indicates the desired maximum liquid level in the tank to raise said sleeve from said first position to said second position to cut off said channel with respect to the tank so that said valve is float-triggered and pressure-operated.

6. The valve of claim 5 wherein said body has attachment means thereon for attaching said body to a service valve which can be attached to a tank fitting so that the service valve can positively turn off flow to and from the tank.

7. A float valve for controlling liquid inflow into a tank to signal when the liquid level in the tank reaches a predetermined level, said float valve comprising:
- a body, a passage in said body, said body having attachment means thereon for attaching said body to a service valve which can be attached to a tank fitting so that said passage in said body is serially connected to the service valve so that the service valve can positively turn off flow to and from the tank through said passage in said body, said body having a shoulder on said body for engagement with a mating surface on the service valve, a channel from said passage through said body to discharge liquid from said passage into the tank;
- a sleeve slidably mounted on said body, said sleeve having a first position wherein said sleeve is away from said channel and a second closed position where said sleeve covers said channel, said sleeve having a collar therein embracing said body, said sleeve being dimensioned so that its mating collar substantially reaches the mating surface on the service valve when in its closed second position, said sleeve having a bottom cap thereon, said sleeve being dimensioned so that said bottom cap is against the lower end of said body when said sleeve is in its closed second position, said collar having an upwardly facing area exposed to pressure in the tank and an equal downwardly facing area facing the pressure within said sleeve so that when said sleeve is away from its first position, during filling the fluid pressure within said sleeve causes a net upward force on said sleeve; and
- a float attached to move said sleeve with respect to said body when said float indicates the desired maximum liquid level in the tank to move said sleeve from said first position towards said second position.

8. The valve of claim 7 wherein said sleeve is tubular and has an inwardly directed collar thereon substantially engaging said body in sliding relationship and said body has a spring flange thereon, said spring being positioned between said collar and said spring flange.

9. The valve of claim 8 wherein said sleeve has a cap thereon and said float is mounted on said cap.

10. The valve of claim 9 wherein the length of said body from said shoulder to said spring flange is substantially equal to the length of said sleeve from said shoulder to said cap so that, when said collar is even with said shoulder, said spring flange is substantially in engagement with said cap.

11. A float valve for controlling liquid inflow to a tank to signal when liquid level in the tank has reached a predetermined level, said float valve comprising:
- a body for mounting on means in the tank, a passage in said body, said body being for positioning in the tank so that all liquid inflow into the tank passes through said passage in said body, a plurality of discharge channels from said bore into said tank, said plurality of discharge channels being nonsymmetrically arranged;
- a sleeve slidably mounted on said body, said sleeve having a lower first position where said sleeve is away from said channel and a closed second position where said sleeve covers said channel, said sleeve having a collar therein embracing said body, said sleeve having an upwardly facing area exposed to tank pressure and an equal downwardly facing area subjected to pressure within said collar therein embracing said body, said sleeve having an upwardly facing area exposed to tank pressure and an equal downwardly facing area subjected to pressure within said sleeve so that when said sleeve rises away from said first position and covers said channel, said downwardly facing area is subjected to pressure from said channel which is higher than tank pressure during filling so that a net upward force is applied to said sleeve by said pressures to urge said sleeve towards said closed second position; and
- a float attached to move said sleeve with respect to said body when said float indicates the desired maximum liquid level in the tank to raise said sleeve from said first position to said second position to cut off said channel with respect to the tank by raising said sleeve against said mounting means so that said float valve is float-triggered and fluid pressure-operated.

* * * * *